United States Patent

Tan

[19]

[11] Patent Number: 6,043,740
[45] Date of Patent: Mar. 28, 2000

[54] VEHICLE SIGNALLING APPARATUS

[76] Inventor: Boon Yang Tan, 31 Margoliouth Road, Singapore, Singapore, 258557

[21] Appl. No.: 09/125,667

[22] PCT Filed: Feb. 24, 1996

[86] PCT No.: PCT/SG97/00007

§ 371 Date: Aug. 20, 1998

§ 102(e) Date: Aug. 20, 1998

[87] PCT Pub. No.: WO97/30869

PCT Pub. Date: Aug. 28, 1997

[51] Int. Cl.[7] ...................................................... B60Q 1/34
[52] U.S. Cl. ........................... 340/475; 340/476; 340/477; 340/478; 340/465; 340/526; 340/527
[58] Field of Search ..................... 340/475, 478, 340/468, 476, 477, 465, 472, 526, 527, 309.15, 309.1; 362/61; 40/442, 589, 902; 307/112, 132 R, 139

[56] References Cited

U.S. PATENT DOCUMENTS

| 4,387,361 | 6/1983 | Reed | 340/475 |
| 4,994,786 | 2/1991 | Schaffer | 340/478 |
| 5,003,289 | 3/1991 | Roman | 340/468 |
| 5,086,289 | 2/1992 | Sullivan et al. | 340/475 |
| 5,281,950 | 1/1994 | Le | 340/475 |
| 5,432,500 | 7/1995 | Scripps | 340/628 |

*Primary Examiner*—Benjamin C. Lee
*Attorney, Agent, or Firm*—George O. Saile; Stephen B. Ackerman

[57] ABSTRACT

This device for giving and controlling a vehicle U-turn signal comprises a U-turn signal indicator (1) and a control circuit. The U-turn signal indicator (1) can consist of an array of LEDs which makes a loop circuit with an arrow. One can be mounted on the front plate (2) of a vehicle, and another one can be mounted on the back plate. The control circuit consists of a rectifier, a first integrator, a second integrator, a counter, a switching transistor, and a relay. The output of the rectifier is connected to the inputs of the first and second integrators of which the outputs are connected to the CLK and to the RST of the counter respectively. The outputs of the counter and the rectifier are connected to the inputs of the NAND which controls the on or off working state of the switching transistor and the relay, to activate the U-turn indicator. The input of the rectifier is connected to the turn signal pulses of a vehicle. When certain pulse patterns are generated, the U-turn signal indicator is activated.

13 Claims, 2 Drawing Sheets

VEHICLE SIGNALLING APPARATUS

This invention relates to apparatus for giving and controlling vehicle signals, such as vehicle U-turn signals.

Most vehicles are equipped generally with turn signals commonly referred to as left and right turn indicators. Using such turn signals to indicate the intention of a driver to make a U-turn is inconvenient in operation and ambiguous in meaning, which can result in an increase in the frequency of accidents.

The invention seeks to mitigate problems such as this.

According to the invention there is provided a vehicle signalling system comprising a main indicator, an activating device, a timing device for measuring the intervals during which the activating device is not activated and means responsive to the activating device and to the timing device to activate the main indicator when the measured interval is less than a threshold value.

With fewer parts, eliminating extra switches, brackets, and redundant activation operations, apparatus embodying the invention can use the on-off-on wording state of an existing turn signal as the input.

The U-turn indicator may comprise an array of LEDs which makes a loop circuit with an arrow.

The invention will further be described by way of example with reference to the accompanying drawings, in which.

In this embodiment the turn display comprises a plurality of LEDs 1, activated by a battery B1 through normally open contacts for a relay. The relay coil is activated by a battery B2 through a switching transistor 8550.

The vehicle has a turn indicator control (not shown) which causes a train of pulses to be supplied through a rectifier consisting of diodes D1 and D2 in series and a resistor RS return to earth. The pulse train is applied through respective diodes D4 and D5 to integrators I1 (C1 R1) and I2 (C2 R2), the time constant of I1 being less than that of I2. The output of I1 is applied through two inverters N2 and N3 in series to the clock input of a counter UL; the output of the integrator I2 is applied through a single inverter N1 to the reset input of the counter UL. The counter has outputs Q1, Q2, Q3 etc., and the outputs Q2 and Q3 are applied to respective inputs of a NOR gate through an inverter N4 to one input of a NAND. The rectified pulse train is applied directly to the other input of the NAND, whose output is connected to the base of switching transistor 8550 through a resister R4.

Figure 1:
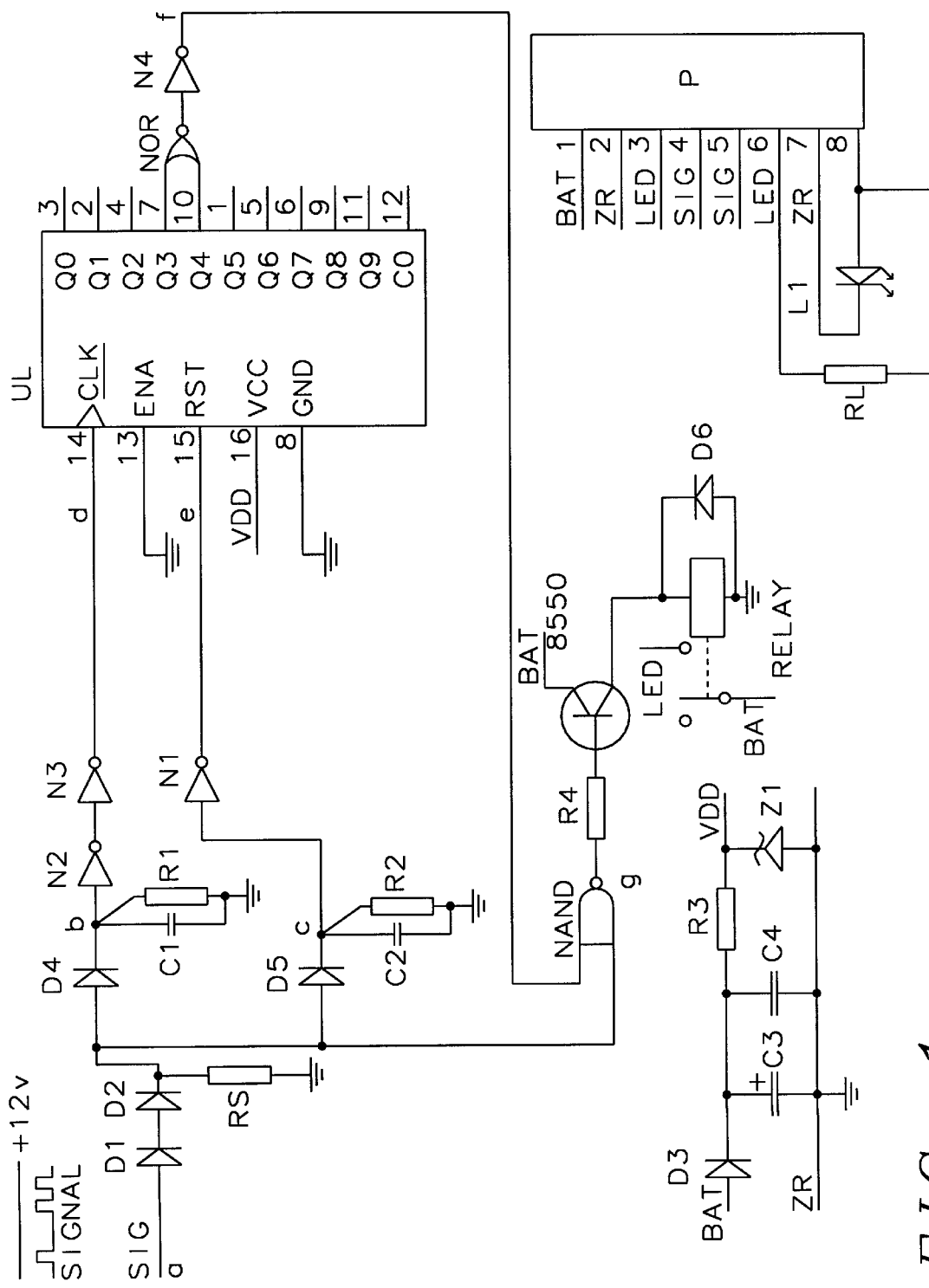
FIG. 1 is a control circuit diagram of apparatus embodying the invention.
Figure 2:
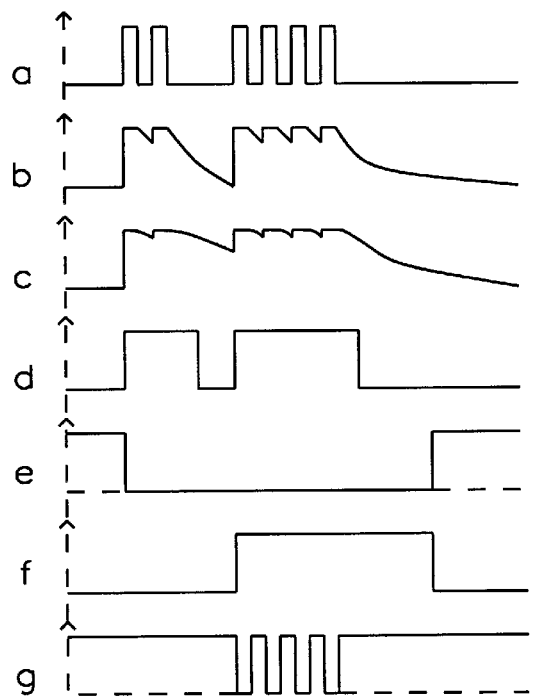
FIGS. 2a–2g are wave forms of the control circuit of FIG. 1.

The effect of this circuit is that the NAND gates the rectified pulse train being applied to the switching transistor 8550 according to the state of the counter UL. FIG. 2 shows waveforms at different points in the circuit. Waveform (a) shows a first pulse train of two pulses followed by a short delay, less than 3 seconds, followed by a second pulse train of four pulses, followed by a long delay. When the pulse train starts, the rectified pulses charge up the integrators, whose outputs are then high. When the train stops, the outputs decay according to their time constants (waveforms (b) and (c)), so that after a first time the clock input will be changed from high to low (waveform (d)) and after a second longer time the reset input will be changed from low to high (waveform (e)) provided that no further pulse train has started. The outputs start to decay after the pulse train stops, so the integrators are measuring the time during which the twin indicator control is not activated. When a second pulse train starts the integrators will again charge up.

Considering first the case where the second train starts after both integrator outputs have dropped to the level which causes their output inverter to change state, as shown at the right hand ends of the waveforms, the reset input of the counter will have been activated and so the counter will be at zero. The following pulse train generated when the turn indicator is activated again will therefore be treated in exactly the same way as the first pulse train.

Considering now the case where the second pulse train starts after the first integrator has dropped to change the state of its inverter, but before the second integrator has changed the state of its inverters, as at the left hand end of the waveforms, the reset input of the counter will not have been activated (waveform (e) remains low) and the counter will retain its count of one. When the second train arrives, the charging up of the first integrator will cause the counter to increase its count to two and the consequent output on Q2 (waveform (f)) will activate the NOR gate and enable the NAND which is gating the rectified pulse train being applied to the switching transistor. The switching transistor and the relay are thus energised by the gated pulse train (waveform (g)) and the U-turn indicator activated. The indicator continues to be activated until the pulse train stops, and 3 seconds later the second integrator output decays sufficiently to reset the counter, thus disabling the NAND. If the turn indicator control is activated again before the 3 second elapses counter UL will advance its count to 3 and the NAND gate will remain enabled and the U-turn indicator will be re-activated.

A further activation of the turn indicator control within 3 seconds will not keep the NAND gate enabled because there is no connection from the Q4 output of the counter UL to the inverter N4.

In this embodiment, the time constant of the second integrator is selected so that the waveform (e) goes high 3 seconds after the pulse train stops provided another train has not started. 3 seconds corresponds to the time between the end of the right hand pulse in waveform (a) and the rise of waveform (e). The time between the end of the first pulse train and the start of the second is less than 3 seconds and so waveform (e) continues to remain low.

As a practical matter, the driver should wait at least 3 seconds after activating the U-turn indicator (by activating the turn indicator control twice in quick succession) before activating the turn indicator control again, in order to allow the U-turn indicator to be reset.

The connection of Q2 and Q3 to respective inputs of NOR gate prevents noise from the turn signal triggering the U-turn indicator falsely, since such noise may cause the counter to advance its count by one other than as a result of the signals from the integrators I1 and I2.

Figure 3:
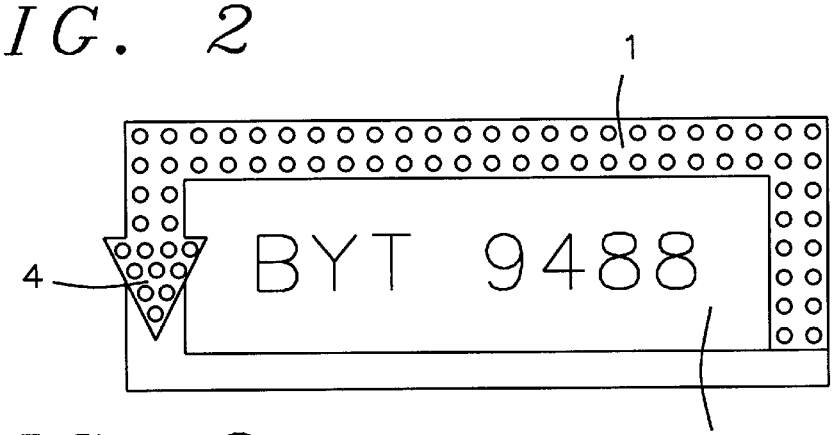
FIG. 3 is a schematic illustration of a first U-turn indicator for use in apparatus embodying the invention.

As shown in FIG. 3, a hollow rectangle array of LEDs 1 (the U-turn indicator) is placed in a transparent plastic loop set and mounted on the rear plate 2 of the vehicle. The sides of the rectangle embrace the licence plate.

An arrow head 4 is incorporated pointing downward on the left hand side of the indicator. A similar indicator can be mounted on the front plate of the vehicle with its arrow head pointing downward on the right side.

Figure 4:
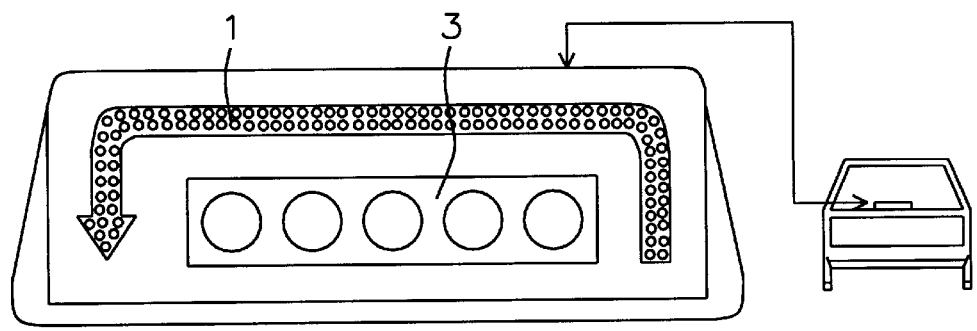
FIG. 4 is a schematic illustration of a second U-turn indicator for use in apparatus embodying the invention.

FIG. 4 illustrates another way by which a brake indicator 3 is combined with the U-turn indicator 1, both of them being mounted on the back inside window of a vehicle. In this case, the brake indicator 3 and the U-turn indicator 1 are in different flashing colours. For example, the brake indicator is in red, while the U-turn indicator is in amber-green.

The LEDs of the U-turn indicator can all be energised together or further switching means can be incorporated so that groups of LFDs are energised sequentially with the pulses of the train. The groups can be of different colours, or at different locations such as the opposite sides of the display.

What is claimed is:

1. A vehicle signalling system comprising a main indicator, an activating device, a timing device for measuring the intervals during which the activating device is not activated and means responsive to the activating device and to the timing device to activate the main indicator when the measured interval is less than a threshold value.

2. A system is claimed in claim 1, wherein a second indicator activating means is arranged to respond to the activating device after each of a limited number of successive intervals less than the threshold value.

3. A system as claimed in claim 2, comprising a further indicator, and means responsive to any activation of the activating device to energise the further indicator.

4. A system according to any one of claims 1 to 3, wherein the timing device includes a plus counter.

5. A system according to claim 4, wherein the means responsive to the timing device includes a switching transistor and a relay.

6. A system according to claims 5, wherein the activating device is adapted to control operation of the turn indicators of the vehicle.

7. A system according to claim 6, wherein the main indicator is adapted to indicate the performance of a U-turn.

8. A system according to claim 7, wherein the U-turn indicator comprises a plurality of LEDs.

9. A system according to claim 8, the main indicator being adapted for mounting for viewing through a window of the vehicle.

10. A system according to claim 9, wherein the main indicator includes an arrow head.

11. A system according to claim 8, the main indicator being disposed in a licence plate of the vehicle.

12. A system according to claim 6, wherein the LEDs are arranged to form substantially a U-shape.

13. A system according to claim 7, wherein the control circuit is adapted to energise the LEDs sequentially, from one arm of the U, to the other.

* * * * *